United States Patent [19]

Gonzalez

[11] Patent Number: 5,252,206
[45] Date of Patent: Oct. 12, 1993

[54] FILTRATION CARTRIDGE

[76] Inventor: Carlos Gonzalez, 7962 NW. 66th St., Miami, Fla. 33166

[21] Appl. No.: 914,878

[22] Filed: Jul. 16, 1992

[51] Int. Cl.⁵ .............................................. B01D 27/04
[52] U.S. Cl. .................................... 210/282; 210/315; 210/510.1; 55/523
[58] Field of Search ............... 210/264, 269, 282, 283, 210/314, 315, 510.1; 55/523

[56] References Cited

U.S. PATENT DOCUMENTS 5,164,085 11/1992 Spokoiny ........................ 210/497.01

Primary Examiner—Robert A. Dawson
Assistant Examiner—W. L. Millard
Attorney, Agent, or Firm—Malloy & Malloy

[57] ABSTRACT

A filtration cartridge, adapted to be utilized within any industry standard housing, the cartridge including a generally cylindrical outer filter having an axial bore and a surrounding side wall structure, the surrounding side wall structure including a carbon block filtration layer structured and disposed to allow the passage of the water therethrough into the axial bore so as to remove chemical contaminants such as chlorine, chloroforms, and the like, the filtration cartridge further including a cylindrical ceramic filter structured and disposed for removable positioning within the axial bore of the outer filter such that water will pass therethrough, after passage into the axial bore of the outer filter through the carbon block, into an axial bore within the ceramic filter for passage out an open distal end of the ceramic filter, thereby further filtering the water from bacteria and particulates before being used.

6 Claims, 1 Drawing Sheet

FILTRATION CARTRIDGE

BACKGROUND OF THE INVENTION

This invention relates to a filtration cartridge, for use within an industry standard housing, the cartridge being adapted for use within most standard filtration systems while providing a carbon block and ceramic filter to cleanse water of not only chemical contaminants such as chlorine, chloroforms and the like, but also from bacteria and particulates in the water, utilizing a single filtration cartridge.

DESCRIPTION OF THE RELATED ART

Filtration devices are often used to filter water which is intended for human consumption. These filtration devices are often connected to a water source for the passage of water therethrough before emerging from a faucet. The most commonly employed type of filtration medium involves removable filter cartridges which when dirtied, can be removed and replaced by a clean filtration cartridge, thereby always assuring the maximum cleaning possible. Fortunately for consumers, most filtration housings are made in industry standard sizes such that a consumer may have their pick of which cartridge to utilize. Presently, the more common type of filtration cartridges utilize a carbon filter to remove chemical contaminants from the water before dispensing from the faucet. Additionally, some filtration systems include a second filter housing which utilizes a ceramic filter to further cleanse water of bacteria and particulate contamination. In combination, the carbon filter and ceramic filter maximize the purity of the water. Unfortunately, since most filtration systems are built at the industry standard, if an individual wishes to utilize ceramic filtration in addition to the standard carbon filtration, they must add a separate ceramic filter housing. Accordingly, due to the advantages of using both types of filter mediums, it would be highly beneficial to have a filtration cartridge which can fit into standard industry housings, thereby reducing the added expense of adapting existing filtration systems, and will filter chemical as well as bacteria contaminants from the water.

The present invention is designed specifically to maximize the quality of water which is used by individuals, while minimizing the added cost involved with using safer and purer water. Further, since ceramic filters are generally more expensive than carbon filters, the present invention includes a removable ceramic filter which will enable a user to clean the ceramic filter and reuse it, while discarding only the outer carbon filter. As a result, maximum water purity can be achieved without adapting existing filtration systems and without substantially increasing the costs involved.

SUMMARY OF THE INVENTION

The present invention is directed towards a filtration cartridge to be used within industry standard housings. The filtration cartridge includes primarily a generally cylindrical outer filter and a removable inner filter. The cylindrical outer filter includes an open proximal end, an open distal end, a surrounding side wall structure, and an axial bore extending therethrough. Making up the surrounding side wall structure is at least one filtration layer. This filtration layer is a carbon block which is adapted to allow water or a like fluid to pass therethrough into the axial bore of the outer filter, thereby removing chemical contaminants such as chlorine, chloroforms, and the like. The removable inner filter is adapted for removable positioning within the axial bore of the outer filter. As a result of this positioning, water which has passed through the carbon block and into the axial bore of the outer filter will be further filtered by the inner filter before use. This inner filter includes a cylindrical ceramic filter which is structured and disposed to remove bacteria and particulates from the water, thereby further purifying the water. The cylindrical ceramic filter includes an open distal end, a closed proximal end, and an axial bore extending substantially therethrough. This ceramic filter is adapted to enable water which has passed into the axial bore of the outer filter to pass through the ceramic filter into the axial bore of the ceramic filter for subsequent passage out the open distal end of the ceramic filter. Positioned over the open distal end of the ceramic filter is a molded end cap which is adapted to removably secure the ceramic filter within the outer filter and to allow the passage of filtered water emerging from the open distal end of the ceramic filter to pass therethrough out of the housing for normal use.

An object of the present invention is to provide a filtration cartridge which can filter water to remove chemical contaminants as well as bacteria and particulate contaminants.

A further object of the present invention is to provide a filtration cartridge which is adapted for use within industry standard housings, thereby requiring no filtration system adaptation in order to filter water from both chemical contaminants and bacteria and particulate contaminants.

Yet another object of the present invention is to provide a filtration cartridge which includes a removable ceramic filter adapted to be cleaned and reused thereby necessitating disposal of only the relatively more inexpensive carbon block filter.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
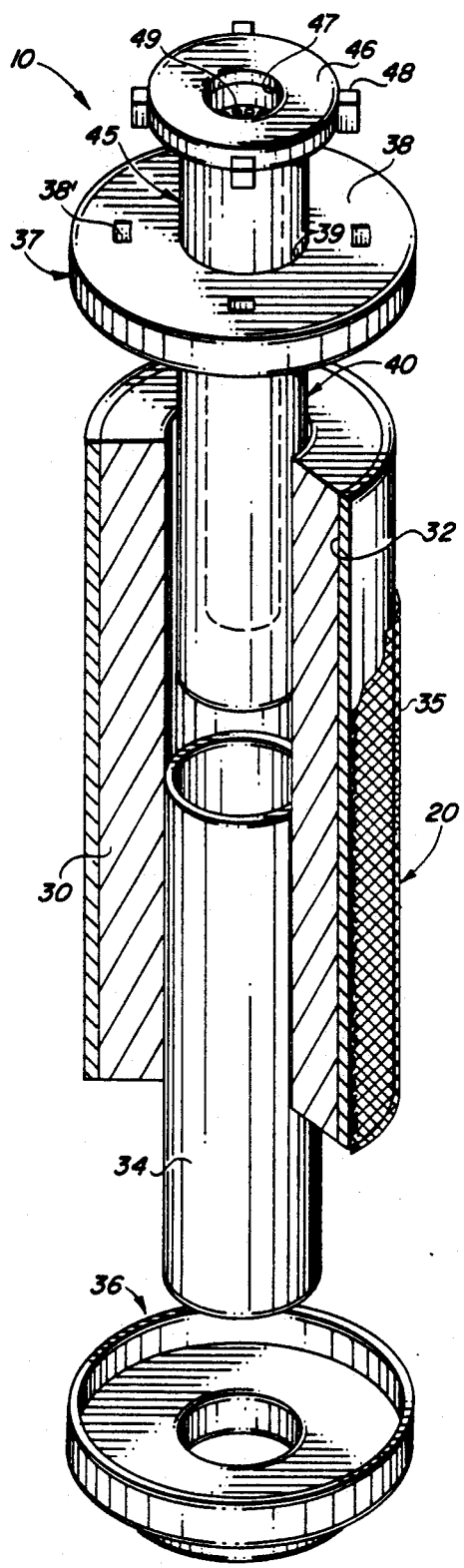
FIG. 1 is an exploded, partial cutaway view of the filtration cartridge.
Figure 2:
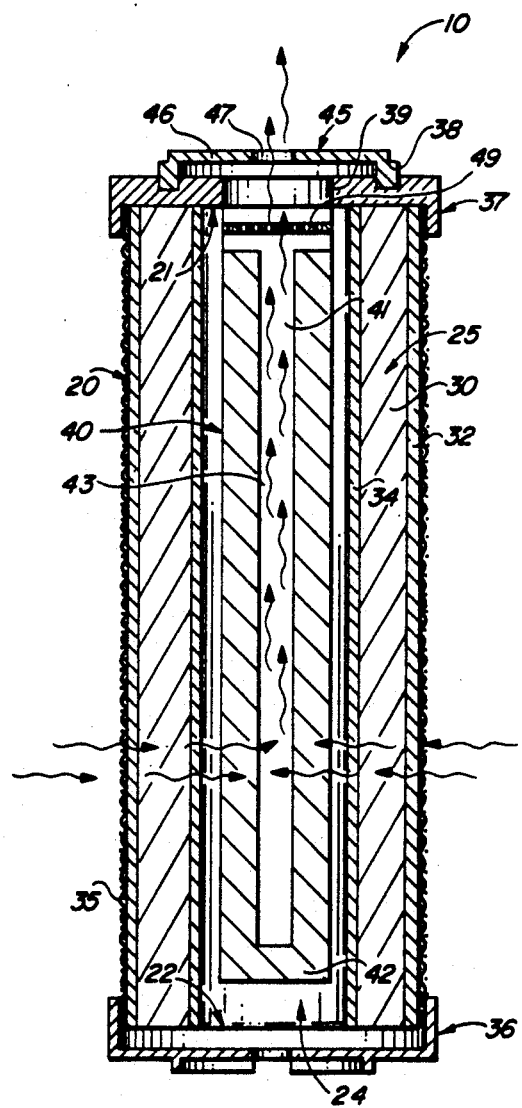
FIG. 2 is a cross-sectional view of the filtration cartridge.

Shown throughout FIGS. 1 and 2, the present invention is directed towards a filtration cartridge, generally indicated as 10, for use within industry standard housings of water filtration systems. The filtration cartridge 10 includes primarily a generally cylindrical outer filter 20 and a removable inner filter 40. The outer filter 20 includes an open distal end 21, an open proximal end 22, and a surrounding side wall structure 25 defining an axial bore 24 extending through the outer filter 20. This outer filter 20 is adapted to allow the passage of water through the surrounding side wall structure 25, where it is filtered by at least one filtration layer, into the axial bore 24. The filtration performed by the outer filter 20 is achieved utilizing a carbon block filtration layer 30 which is structured and disposed to remove chemical contaminants such as chlorine, volatile organic compounds, chloroforms, and numerous other contaminants upon the passage of the fluid therethrough. This carbon block filtration layer 30 made be made up of pulverized, highly purified activated carbon, or compress activated carbon, or extruded fine mesh carbon. Lining a interior surface of the carbon block filter 25 is an inner liner layer 34. This inner liner layer 34 is adapted to prevent carbon from being released from the carbon block filtration layer 30 into the axial bore 24 upon the passage of fluid therethrough. Additionally, if the carbon block filtration layer 30 consists of pulverized, highly purified activated carbon, the liner layer 34 is adapted to compress the carbon within the carbon block filtration layer 35 so as to maintain the layer in tact and contain the carbon particles. Disposed on an outer surface of the carbon block filtration layer 30 is a pre-filtration layer 32. This pre-filtration layer 32 helps prevent premature clogging of the filtration system and eliminates larger particles and contaminants from the water before it passes into the carbon block filtration layer 30 for increased purification. Positioned over the open distal end 21 and open proximal end 22 of the outer filter 20 are a distal seal cap 37 and a proximal seal cap 36. These seal caps 36 and 37 are adapted to provide secure fitting of the filtration cartridge 10 within the industry standard housing and may have flexible gaskets positioned thereon for a secure fit. Additionally, the distal seal cap 37 includes a central opening 39 to enable access to the axial bore 24 therethrough.

Concentrically positioned within the axial bore 24 of the outer filter 20 is the inner filter 40. This inner filter 40 is a cylindrical ceramic filter which is adapted to remove bacteria and particulates from water passing therethrough, thereby further purifying the water passing through the filtration cartridge 10. This ceramic filter 40 includes an open distal end 41, a closed proximal end 42, and an axial bore 43 extending substantially therethrough. The inner ceramic filter 43 is structured such that water, after passing through the surrounding side wall structure 25 of the outer filter 20 into the axial bore 24 will pass through the ceramic filter 40 into its axial bore 43 for passage out the open distal end 41. Additionally, an extremely fine, anti-corrosive filtration screen 49 is positioned over the open distal end 41 of the inner ceramic filter 40 to cause any medium or ceramic particles to be retained while the purified water passes therethrough. Positioned over the open distal end 41 of the inner ceramic filter 40 is a molded end cap 45. This end cap 45 includes a central opening 47 to allow the passage of purified water therethrough for use, and includes an exterior flange 46 surrounding the central opening 47. This flange portion 46 is adapted to be positioned atop the distal seal cap 37 such that the inner ceramic filter 40 may be removably slid into the axial bore 24 of the outer filter 20 through the central opening 39 of the distal seal cap 37 and the open distal end 21 of the outer filter 20 for secure, supported co-axial positioning. Further, disposed about the central opening 39 in the distal seal cap 37, in spaced apart relation therefrom, is a retaining rim 38. This retaining rim 38 is adapted to contain the flanged portion 46 of the end cap 45 therein, and lock grooves 38' are included such that lock segments 48 disposed about the periphery of the flanged portion 46 of the end cap 45 may be lockingly positioned therein. As a result, the end cap 45, and accordingly, the inner ceramic filter 40, are supported atop the distal seal cap 37 and when desired, the inner ceramic filter 40 may be easily removed from within the outer filter 20. This removability is of particular benefit because when a filtration cartridge 10 becomes used and dirtied, a user may simply remove the inner ceramic filter 40 and clean it while discarding only the relatively more inexpensive outer filter 20.

Finally, included as part of the surrounding side wall structure 25 of the outer filter 20 and disposed about the pre-filtration layer 32 is an outer protective netting layer 35. This netting layer 35 is adapted to protecting the outer filter 20 from damage during handling, and further helps to contain all the filtration layers of the outer filter 20.

Now that the invention has been described,
What is claimed is:

1. For use within an industry standard housing, a filtration cartridge comprising:

a generally cylindrical outer filter, said outer filter including an open proximal end, an open distal end, a surrounding side wall structure, and an axial bore extending therethrough, said surrounding side wall structure including at least one filtration layer, said filtration layer including a carbon block structured and disposed to allow the passage of fluid therethrough into said axial bore so as to remove chemical contaminants such as chlorine, chloroforms, and the like, a removable inner filter structured and disposed for removable positioning within said axial bore of said outer filter so as to further filter the fluid passing into said axial bore through said surrounding side wall structure, said inner filter including a cylindrical ceramic filter structured and disposed to remove bacteria and particulates from fluid passing therethrough, said ceramic filter including an open distal end, a closed proximal end, and an axial bore extending substantially therethrough, said outer filter including a distal seal cap positioned over said open distal end, said distal seal cap including a central opening structured and disposed to enable the passage of said ceramic filter therethrough into said axial bore of said outer filter, a molded end cap positioned over said open distal end of said ceramic filter, said end cap being structured and disposed to removably secure said ceramic filter within said axial bore of said outer filter and to allow the passage of filtered water emerging from said axial bore in said ceramic filter through said open distal end of said ceramic filter to pass therethrough out of the industry standard housing for use, and said distal seal cap further including a retaining rim positioned on an exterior surface of said distal seal cap in substantially spaced apart, surrounding relation with said central opening of said distal seal cap, said retaining rim being structured and disposed to enable said end cap on said ceramic filter to lockingly and supportably engaged therein.

2. A filtration cartridge as in claim 1 wherein said outer filter includes a proximal seal cap positioned in covering relation over said open proximal end of said outer filter.

3. A filtration cartridge as in claim 2 wherein said surrounding side wall structure includes a pre-filtration layer disposed about said carbon block so as to prevent premature clogging of said carbon block.

4. A filtration cartridge as in claim 3 wherein said surrounding side wall structure includes an inner liner layer structured and disposed to prevent the release of carbon from said carbon block into said axial bore in said outer filter.

5. A filtration cartridge as in claim 4 wherein said surrounding side wall structure includes an outer protective netting layer structured and disposed to prevent damage of said outer filter during handling.

6. A filtration cartridge as in claim 5 wherein said end cap includes an extremely fine, anti-corrosive filtration screen positioned over said open distal end of said ceramic filter structured and disposed to further filter the water exiting therethrough.

* * * * *